(12) United States Patent
Lemanski

(10) Patent No.: US 6,654,550 B1
(45) Date of Patent: Nov. 25, 2003

(54) PORTABLE HAND HELD AUTOMOBILE WINDSHIELD DE-ICER

(76) Inventor: Michael Lemanski, 35 Givati St., Rishon Lezion (IL)

( * ) Notice: Subject to any disclaimer, the term of this patent is extended or adjusted under 35 U.S.C. 154(b) by 0 days.

(21) Appl. No.: 10/241,692

(22) Filed: Sep. 12, 2002

(51) Int. Cl.⁷ .............................. H05B 3/00; B60H 1/22
(52) U.S. Cl. ...................... 392/409; 392/431; 219/524; 219/533; 219/203
(58) Field of Search ................................ 392/409, 410, 392/431, 422, 373, 376; 219/203, 524, 533, 522; 52/171.2

(56) References Cited

U.S. PATENT DOCUMENTS

| 873,317 A | * | 12/1907 | Landry | 219/524 |
| 1,452,304 A | * | 4/1923 | McCormack | 392/431 |
| 1,603,670 A | * | 10/1926 | Edmonds | 392/409 |
| 2,025,899 A | * | 12/1935 | Rhodes | 392/431 |
| 2,240,913 A | * | 5/1941 | Roskos | 392/409 |
| 2,414,520 A | * | 1/1947 | Greenwald | 219/203 |
| 2,450,563 A | * | 10/1948 | Rommel | 219/533 |
| 2,686,861 A | * | 8/1954 | Waller | 392/409 |
| 2,694,135 A | * | 11/1954 | Brockmole | 392/409 |
| 2,721,927 A | * | 10/1955 | Beckstrand | 219/533 |
| 3,353,005 A | * | 11/1967 | Sisson et al. | 219/411 |
| 4,591,697 A | * | 5/1986 | Lexer | 392/412 |
| 5,060,289 A | * | 10/1991 | Abramson | 392/423 |

FOREIGN PATENT DOCUMENTS

| DE | 364275 | * | 11/1922 | ................. 392/422 |
| DE | 4122462 | * | 1/1993 | |
| EP | 271430 | * | 6/1988 | |
| GB | 1133431 | * | 11/1968 | ................. 392/422 |

* cited by examiner

*Primary Examiner*—John A. Jeffery
(74) *Attorney, Agent, or Firm*—Mark M. Friedman

(57) ABSTRACT

A hand held device is deployed adjacent to the inside surface of a window so as to remove ice from the outside surface of the window by employing infrared heat energy that melts the ice adjacent to the interface of the ice and the window. As the ice adjacent to that interface is melted, the remaining unmelted ice is free to slide away. The device is moved across the inside of the window, thereby removing the ice from substantially the entire outside surface of the window. The device may be closed for transportation, and opened for use. It also includes a normally "off" safety switch to activate the infrared heat energy source.

5 Claims, 6 Drawing Sheets

PORTABLE HAND HELD AUTOMOBILE WINDSHIELD DE-ICER

FIELD AND BACKGROUND OF THE INVENTION

The present invention relates to the removal of ice located on the outside surface of a window by a device operated on the inside of the window and, in particular, it concerns a hand held device deployed adjacent to the inside surface of a window so as to remove ice from the outside surface of the window by employing infrared heat energy that melts the ice adjacent to the interface of the ice and the window.

The most common means of removing ice from automobile windshields has been, and still is, to stand outside the automobile and scrape the ice off the windshield using any number of scraping devices of varying sizes and shapes.

Numerous methods and devices have been suggested over the years for the removal of ice from the outside of a vehicle windshield by a person on the inside of the vehicle. The majority of these suggestions are for devices using infrared heat sources. Early examples include U.S. Pat. Nos. 1,243,703 to Brumeister et al., U.S. Pat. No. 1,668,678 to Hassinger, U.S. Pat. No. 1,754,669 to Cohen, and U.S. Pat. No. 1,917,141 to Middleton, and Swiss Patent No. 162,876 to Grossauer. Examples that are more recent include French Patent No. 2590789A to Lepinoy and German Patent No. 4122462A to Binder. In all these cases, the devices are mounted to a surface either permanently or temporarily during use.

A hand held portable de-icer is disclosed in European Patent No. 271430A to Fleck. This device includes a conical reflector with a clear cover to protect the heating element. EP 271430A does not teach, however, any structure that allows the device to become more compact between uses.

There is therefore a need for a handheld device operated on the inside of a vehicle, or other window, for the removal of ice from the outside surface of the vehicle windshield, or other window, the device being structurally configured so as to become more compact for storage purposes. It would be advantageous if the device, when in the compact state, were to provide protection of the heating element during transportation. It would be of further advantage if the device included a safety switch so as to prevent unintentional activation.

SUMMARY OF THE INVENTION

The present invention is a hand held device deployed adjacent to the inside surface of a window so as to remove ice from the outside surface of the window by employing infrared heat energy that melts the ice adjacent to the interface of the ice and the window.

According to the teachings of the present invention there is provided, a device for removing ice located on the outside surface of a window, the device being deployed adjacent to an inside surface of the window, the device directing infrared heat energy through the window, the device comprising: (a) a main housing; (b) an infrared heat energy source mounted to the main housing; (c) at least one reflector attached to the main housing, the reflector configured so as to direct the infrared heat energy toward the window; and (d) at least one panel movably attached to the main housing, the panel being deployable between a closed and open position, such that when the at least one panel is deployed in the closed position the infrared energy source is substantially enclosed in a volume defined by the main housing and the at least one panel, and when the at least one panel is deployed in the open position the infrared heat source is exposed.

According to a further teaching of the present invention, the at least one panel is hingedly attached along at least part of a first side to the main housing.

According to a further teaching of the present invention, the at least one panel is implemented as two panels such that the volume is defined by the main housing and the two panels in that each of the two panels includes closure surfaces which have corresponding closure surfaces included in an other of the two panels such that when the two panels are deployed in the closed position, the closure surfaces substantially abut the corresponding closure surfaces.

According to a further teaching of the present invention, the two panels are configured so as to hingedly rotate in opposite directions.

According to a further teaching of the present invention, the at least one reflector is implemented as two reflectors, each one of which is mounted to an inside surface of one of the two panels.

According to a further teaching of the present invention, each one of the two panels includes at least one window-contact surface, such that deployment of the device with the panels deployed in the open position and the window-contact surface of each of the two panels in contact with the window defines an optimal distance of the infrared heat source from the window.

According to a further teaching of the present invention, the infrared heat energy source is electrically powered by a remote power source.

There is also included according to a further teaching of the present invention, a safety switch for activation of the infrared heat energy source, the safety switch configured as a normally off switch such that the switch must be held in an on position in order to activate the infrared heat energy source.

According to a further teaching of the present invention, the main housing is held by use of a handle, and the handle is used to position the device in relation to the window.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a hand held device for deployment adjacent to the inside of a window that removes ice from the outside surface of the window by employing infrared heat energy to melt the ice adjacent to the interface of the ice and the window. The preferred embodiment of the present invention referred to herein is intended for, but not limited to, removal of ice from automobile windshields.

By way of introduction, a preferred method for the use of the embodiment of the present invention discussed herein is as follows: The infrared heat energy source is activated. The device is positioned in such a way as to direct the infrared heat energy toward the interface of the ice and the window. The infrared heat energy melts the ice adjacent to the interface, which allows the remaining un-melted ice to slide away. The device is moved in relation to the window thereby melting the ice adjacent to the interface over a larger area of the outside surface of the window, thereby removing the ice form the window.

The principles and operation of a hand held device deployed on the inside of a window so as to remove ice from the outside surface of the window by employing infrared heat energy to melt the ice adjacent to the interface of the ice and the window according to the present invention may be better understood with reference to the drawings and the accompanying description.

Figure 1:
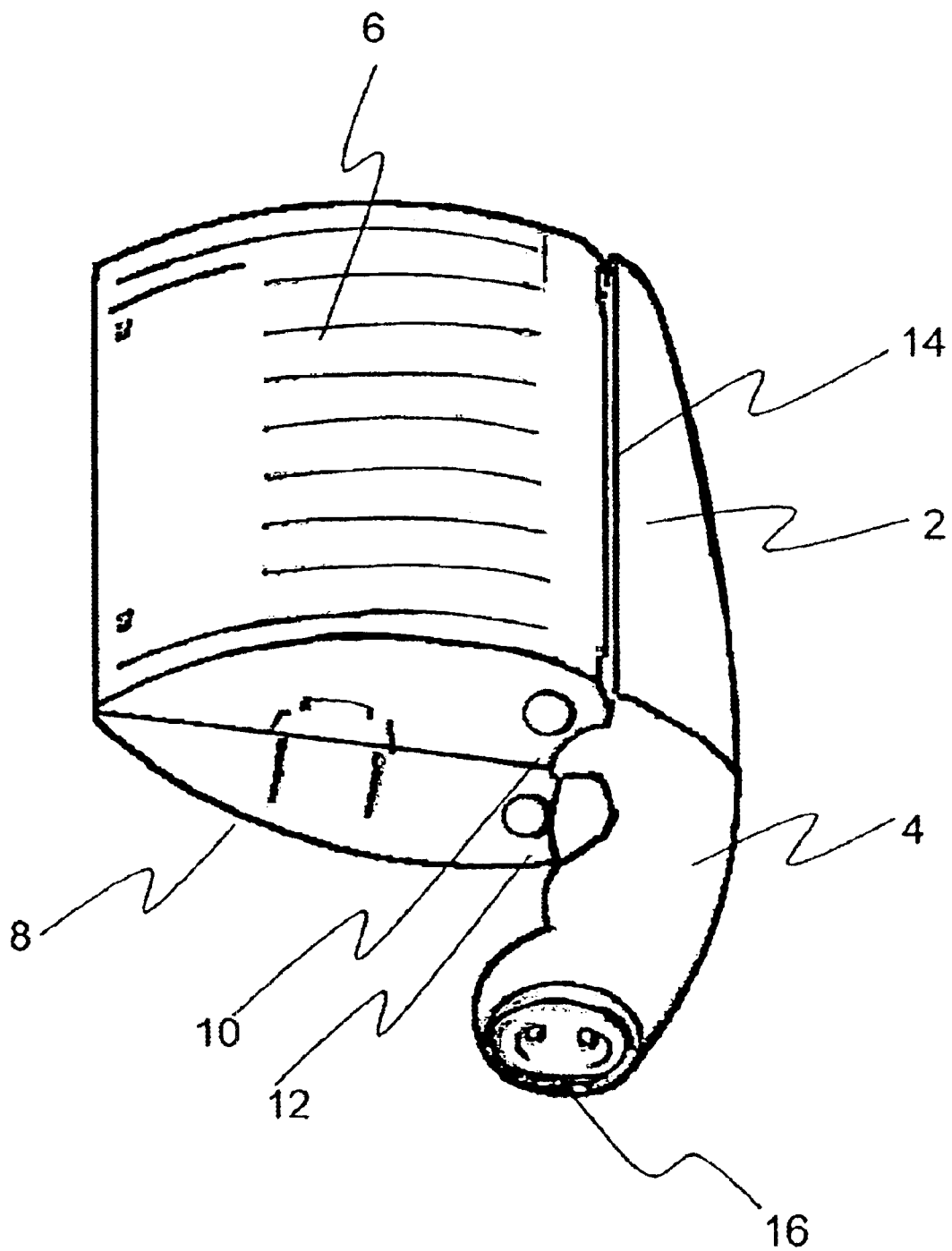
FIG. 1 is a side perspective view of a hand held window de-icer constructed and operative according to the teachings of the present invention, shown in a closed state.
Figure 4:
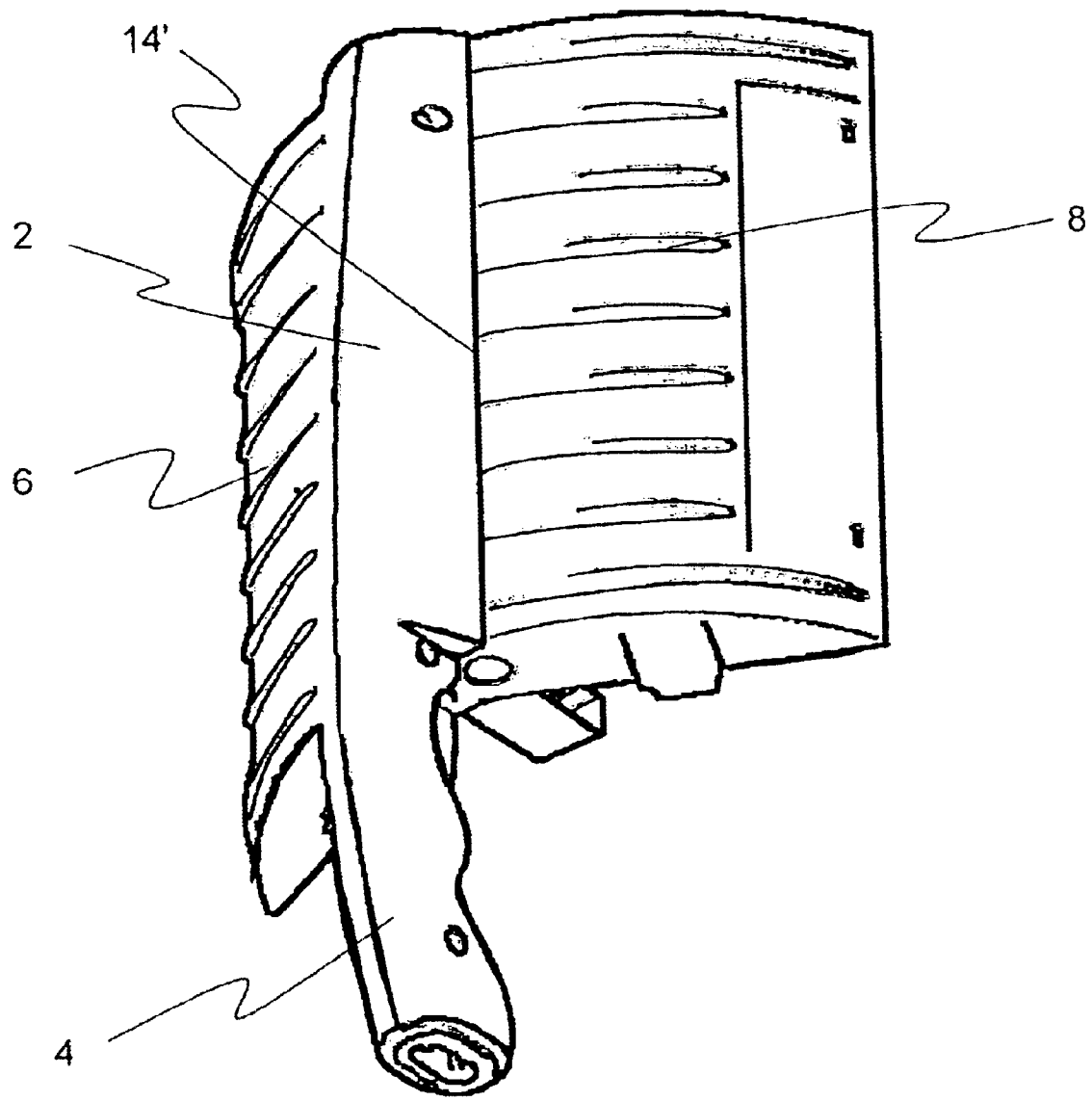
FIG. 4 is a rear perspective view of the embodiment of FIG. 1, shown in an open state.

As seen in FIG. 1, the preferred embodiment described herein includes a main body 2 that extends into a handle 4, and two hingedly attached reflector support panels 6 and 8. The reflector support panels 6 and 8 are attached to the main body 2 by hinge pins 10 and 12 respectively, and corresponding hinge pins 10' and 12' located on the top of the main body. The main body 2 also includes two abutments surfaces 14 and 14' (FIG. 4) located on either side of the main body. These abutment surfaces serve to limit the outward rotation of the reflector support panels 6 and 8 when the reflector support panels are deployed in an open position. The handle 4 includes a socket 16 for receiving a power cord (not shown) which is configured for connection to an appropriate power supply. When deployed in a closed position, as shown here, the edges to each of the reflector support panels 6 and 8 comes into contact with the corresponding edges of the other support panel so as to substantially seal the internal volume defined by the main body 2 and the two support panels 6 and 8, thereby protecting the infrared heat source.

Figure 2:
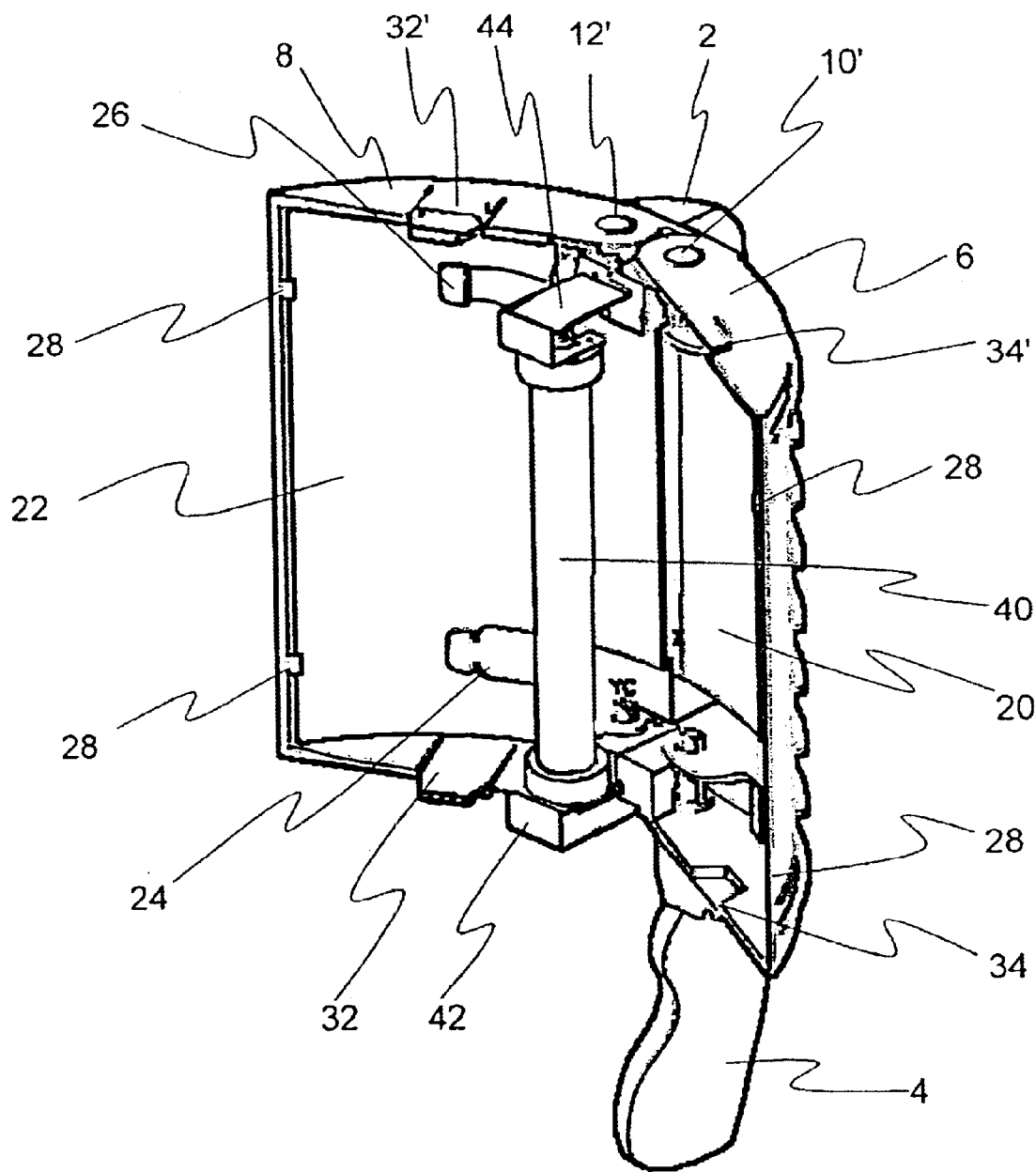
FIG. 2 is a front perspective view of the hand held window de-icer of FIG. 1, shown in an open state.

FIG. 2 further, illustrates this preferred embodiment of the present invention with the reflector support panels 6 and 8, and thus the reflectors 20 and 22, deployed in an open position. A reflector is attached to the inside surface of each of the reflector support panels. In this embodiment, the reflectors are implemented as thin metal panels each of whose reflective contour is determined by the interior surface of the reflector support panel to which it is attached. Each of the reflectors is held in place on the reflector support panels 6 and 8 by nibs 28, and contact with other attachment structures not illustrated. Further attachment support is supplied by the leaf spring elements 24 and 26, which also serve to keep the reflector support panels 6 and 8 deployed in the open position when so deployed (as illustrated here). The infrared heat source 40 is mounted to the main body 2 by attachment to metal electrical attachment contacts 42 and 44. Alternatively, attachment to the main body and electrical contact to the power source may be achieved by use of separate attachment element. Further alternative attachment may be to one of the reflector support panels. The infrared heat source may include, but not be limited to, infrared heat lamps, bars, or resistive coils. Also shown here are closure locking tabs 32 and 32', and closure locking notches 34 and 34', which work in concert to lock the reflector support panels in a closed position when so deployed. Release from the locked position is achieved by pressing the closure locking tabs inwardly until they are free of the closure locking notches. Alternatively, the reflectors may be configured from any infrared reflective material. Further, the contour of the reflectors may be predetermined and unaffected by shape of the reflector support panel. A further alternative may include an integral "reflector panel" configured from an infrared reflective material with one surface configured as a reflector, or a "reflector panel" configured from non-reflective material with one surface configured as a reflector, to which a coating of reflective material is applied.

Figure 3:
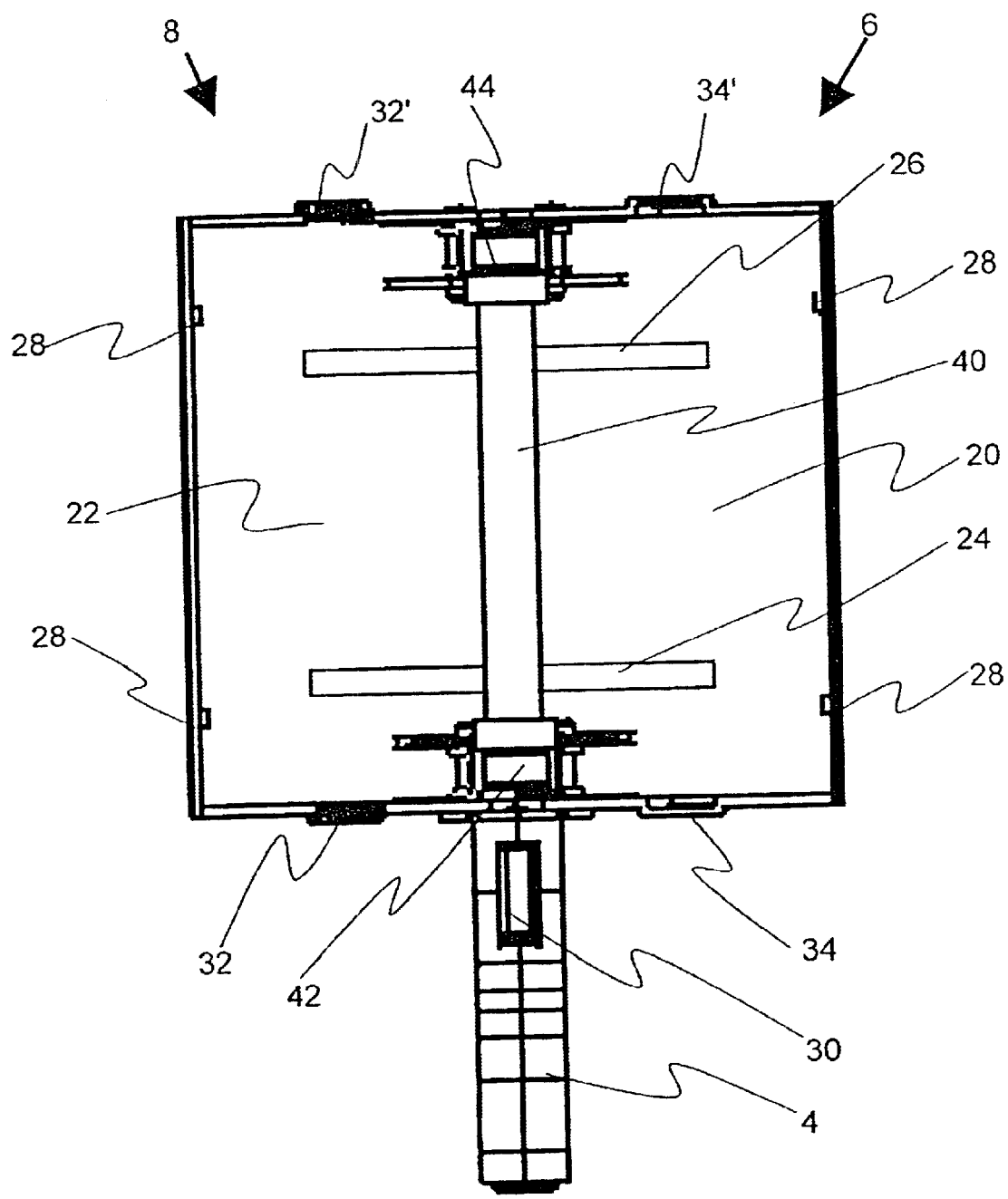
FIG. 3 is a front elevation of the embodiment of FIG. 1, shown in an open state.

FIG. 3 is a front elevation showing many of the same features as FIG. 1, some of which are more clearly viable here, and as such is identically numbered. Additionally visible in the figure is a safety switch that serves as the "on off" switch 30 located on the handle 4. The safety switch is a normally "off" switch configured such that the infrared heat source is activated only when the switch is pressed toward the handle into an "on" position. IF pressure is removed from the switch, it returns to the normally "off" position.

Figure 5:
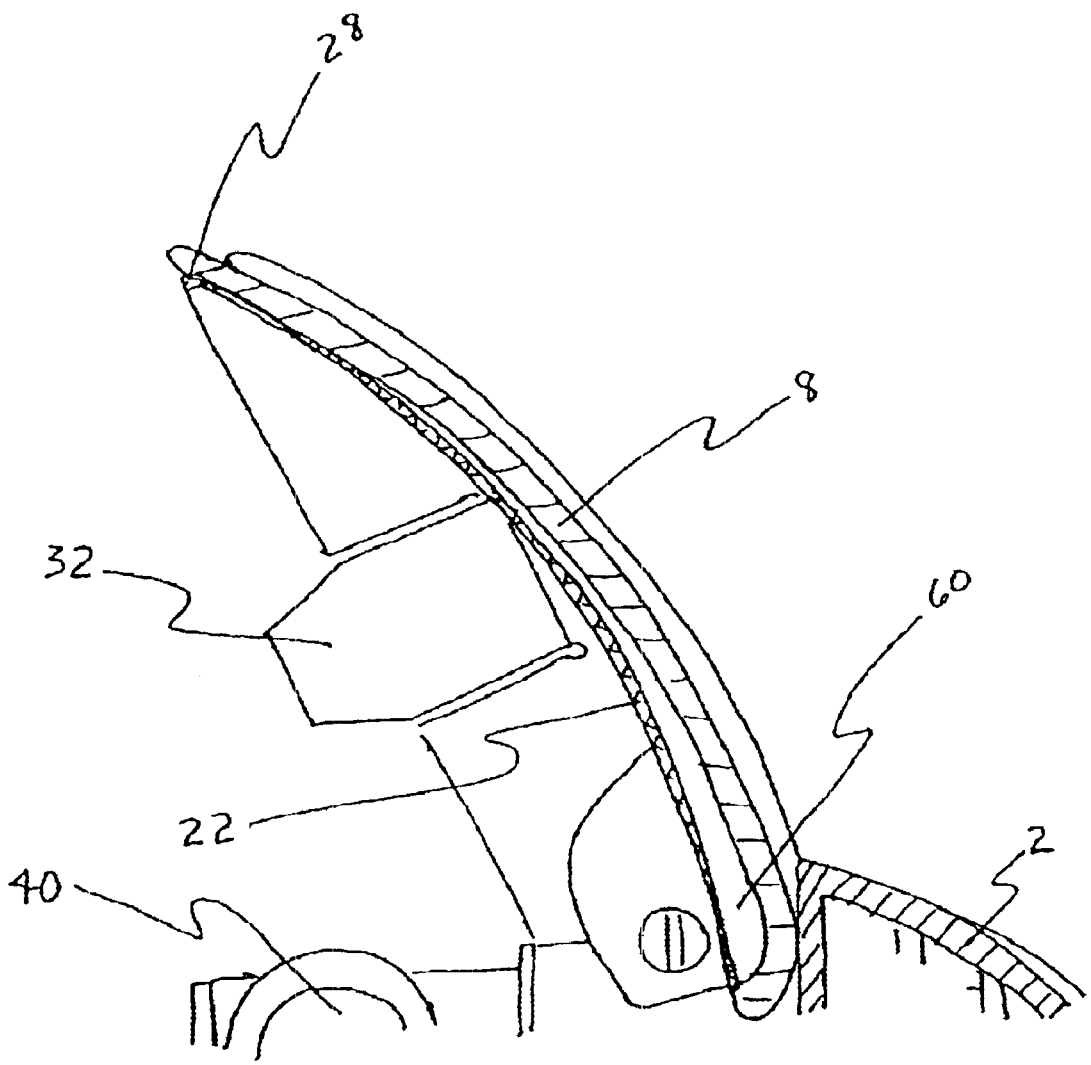
FIG. 5 is a cross-section of a hinged reflector support constructed and operative according to the teachings of the present invention.

The cross-sectional detail of FIG. 5 shows an arrangement of the reflector 22 secured in the reflector support panel 4. Notice the airspace 60 located between the reflector 22 and the reflector support panel 4 in a region near the infrared hear source 40. In this embodiment, the air space serves as a thermal insulator between the reflector 22 and the reflector support panel 4 in that region.

Figure 6:
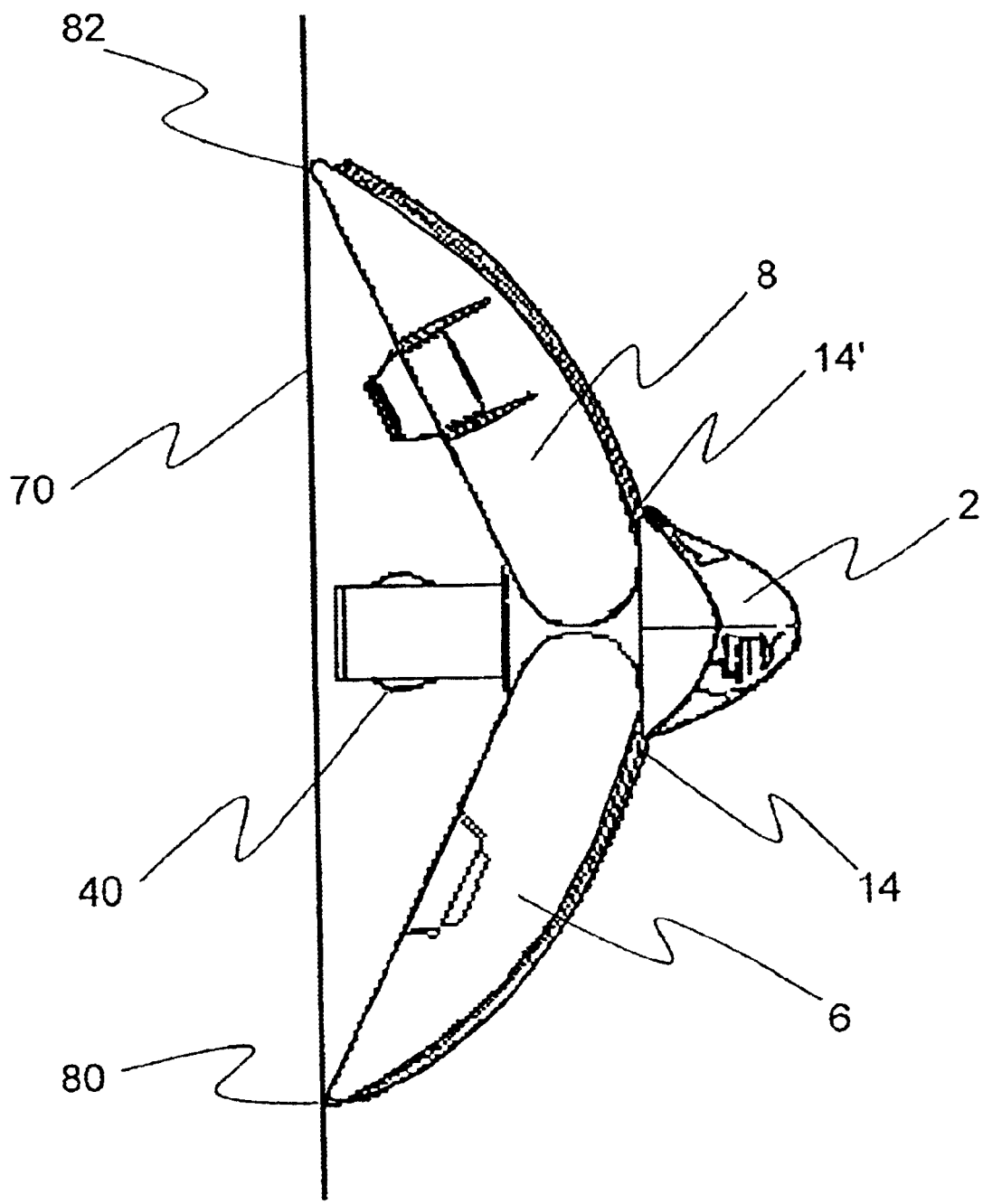
FIG. 6 is atop elevation of the embodiment of FIG. 1, shown in an open state deployed adjacent to a window.

As mentioned a above, the two abutment surfaces 14 and 14' located on either side of the main body serve to limit the outward rotation of the reflector support panels 6 and 8 when the reflector support panels are deployed in an open position. This arrangement is more clearly shown in FIG. 6. Further illustrated are the window-contact surfaces 80 and 82, that are integral to reflector support panels 6 and 8 respectively. The relationship between the window-contact surfaces 80 and 82 and the reflector support panels 6 and 8 establishes the position of the reflectors for optimal reflection of infrared heat energy toward the window 70. Further, with the reflector support panels so deployed the window-contact surfaces 80 and 82 establish the optimal distance between the infrared heat source 40 and the window 70.

It should be noted that embodiments with one moving reflector support panel, one reflective surface, alternate handle placement or no handle, automatically opening reflector support panels or reflectors, and those embodiments with integral power sources, such as batteries, are within the intentions of the present invention.

What is claimed is:

1. A device for removing ice located on the outside surface of a window, the device being deployed adjacent to an inside surface of the window, the device directing infrared heat energy through the window, the device comprising:

(a) a main housing;

(b) an infrared heat energy source mounted to said main housing;

(c) at least two reflectors attached to said main housing, said two reflectors configured so as to direct the infrared heat energy; and (d) at least two reflector support panes associated with said housing, at least one of said reflector support panels being hingedly attached to said main housing, said reflector support panels configured so as to support said two reflectors such that each said reflector is spaced a distance apart from a corresponding said reflector support panel such that a thermal insulating airspace is formed therebetween, said reflector support panels being deployable between a closed and open position, such that when said reflector support panels is deployed in said closed position said infrared energy source is substantially enclosed in a volume defined by said main housing and said reflector support panels, such that when said reflector support panels are deployed in said open position said reflectors cooperate to direct infrared heat energy from the heat source toward the surface of the window.

2. The device of claim 1, wherein each one of said two panels includes at least one window-contact surface, such that deployment of the device with said panels deployed in said open position and said window-contact surface of each of said two panels in contact with the window defines an optimal distance of said infrared heat source from the window.

3. The device of claim 1, wherein said infrared heat energy source is electrically powered by a remote power source.

4. The device of claim 3, further including a safety switch for activation of said infrared heat energy source, said safety switch configured as a normally off switch such that said switch must be held in an on position in order to activate said infrared heat energy source.

5. A device of claim 1, wherein said main housing is held by use of a handle, and said handle is used to position said device in relation to the window.

* * * * *